United States Patent [19]

Leinweber

[11] Patent Number: 5,030,075
[45] Date of Patent: Jul. 9, 1991

[54] APPARATUS FOR MAKING FRICTION ELEMENTS SUCH AS BRAKESHOES AND CLUTCH PLATES

[75] Inventor: Johann Leinweber, Wiener Neustadt, Austria

[73] Assignee: Ing. Johann Leinweber Anstalt Fur Mechanik, Neustadt, Austria

[21] Appl. No.: 462,545

[22] Filed: Jan. 9, 1990

Related U.S. Application Data

[62] Division of Ser. No. 251,859, Sep. 29, 1988, Pat. No. 4,968,468.

[30] Foreign Application Priority Data

Sep. 29, 1987 [AT] Austria ............................ A 2478/87

[51] Int. Cl.⁵ .......................................... B29C 43/18
[52] U.S. Cl. .................................... 425/125; 100/218; 100/226; 264/113; 264/259; 425/126.1; 425/127; 425/128; 425/353; 425/354; 425/397; 425/400; 425/416
[58] Field of Search ............ 425/117, 125, 127, 126.1, 425/128, 352, 354, 353, 397, 398, 400, 411, 406, 416, 422, 444, DIG. 54, 412; 100/218, 260, 226; 264/275, 113, 259, 263

[56] References Cited

U.S. PATENT DOCUMENTS

| | | | |
|---|---|---|---|
| 3,097,411 | 7/1963 | Gerster et al. | 425/354 |
| 3,098,261 | 7/1963 | Littley et al. | 264/113 |
| 3,692,456 | 9/1972 | Foster | 425/416 |
| 3,795,473 | 3/1974 | Holik | 425/126.1 |
| 4,164,537 | 8/1979 | Drostholm et al. | 425/354 |
| 4,640,671 | 2/1987 | Wright | 425/416 |
| 4,652,415 | 3/1987 | Nguyen et al. | 264/275 |
| 4,923,661 | 5/1990 | Russo | 425/126.1 |

FOREIGN PATENT DOCUMENTS

| | | | |
|---|---|---|---|
| 56-92040 | 7/1981 | Japan | 425/416 |
| 730575 | 5/1980 | U.S.S.R. | 425/416 |

Primary Examiner—Jay H. Woo
Assistant Examiner—James P. Mackey
Attorney, Agent, or Firm—Herbert Dubno

[57] ABSTRACT

An apparatus for charging a press for making brakeshoes and the like utilizes an intermediate mold carrying precompacted powder positioned on the press mold. The powder is engaged by the raised press ram and a lowered ejection ram such that the powder trapped between the rams is transferred to the press mold. The intermediate mold is then removed, a counter-pressure plate swingably mounted on a frame of the apparatus is applied into registry with the press mold and the press operation ensues.

8 Claims, 2 Drawing Sheets

APPARATUS FOR MAKING FRICTION ELEMENTS SUCH AS BRAKESHOES AND CLUTCH PLATES

CROSS REFERENCE TO RELATED APPLICATIONS

This application is a division of Ser. No. 07/251,859 filed 29 Sept. 1988, now U.S. Pat. No. 4,968,468 issued 6 Nov. 1990.

SPECIFICATION

1. Field of the Invention

My present invention relates to a method of and to an apparatus for the production of friction members, such as brakeshoes, clutch plates and the like and, more particularly, to a method of charging a press for the production of friction linings, e.g. brake and clutch plates.

2. Background of the Invention

The term "friction linings" as is used herein will be understood to mean friction members or elements which can be utilized as, or as part of, brakeshoes, brake plates, clutch plates and the like. Such friction members are generally produced in presses, usually in heated presses. A brakeshoe, for example, can comprise three parts, namely, the friction lining, an intermediate layer which generally serves to promote bonding with the support or backing plate, and the backing plate which forms a carrier for the lining and may be composed of steel.

In the past, such brakeshoes have been made in a single pressing operation. This has been the case even when the brakeshoe consisted only of the backing plate and the friction lining, i.e. did not make use of an intermediate layer.

However, in the fabrication of such brakeshoes, other techniques have also been used. For example, the lining, with or without the intermediate layer, can be pressed to its finished form and fastened to the backing plate only after the pressing operation.

To fabricate a friction lining, the press mold of the press is filled with the friction powder and, in some circumstances also with the intermediate-layer powder and, if desired, a backing plate can be placed on the mold. The pressing operation can then begin and generally comprises alternating pressing and varying cycles, the phases permitting gasses evolved during the pressing of the lining material to be released. The lining material generally comprises thermosetting agents and hardens under the heat and pressure of the press. Once the lining is hardened, the press is opened and the finished friction member removed.

It is customary to provide a plurality of such presses in a press installation. A press installation of this type is often constituted as a turntable machine. A given number of hot presses (usually 6, 12, 18 or 24) are fastened around the periphery of a turntable and the turntable is stepped in a circular path so that each of the hot presses in succession will be disposed in a fixedly located handling station or a plurality of such handling or manipulation stations.

At a first of these stations, the finished lining is removed from the hot press. Then the hot press can be cleaned and the parts which might come into contact with the lining or intermediate layer material can be sprayed with a parting or separating agent reducing addition of material to these parts.

At a second manipulation station, the mold is filled with a friction lining mass and the backing plate is then placed upon the mold.

The whole press then closes and the hardening process begins. During the hardening process the hot press moves on a closed path and returns to the first manipulation station at which the finished brake lining is removed and a new cycle is commenced.

Various ways have been proposed for charging of the press. For example, the press can be charged directly with the pulverulent material. This is disadvantageous because the press is not readily accessible from above and it is difficult to ensure a uniform thickness of the intermediate-layer powder over the friction layer powder.

The term "powder" in this sense is intended to mean any supporting material which can be pressed into a friction lining and thus includes fibrous material and granular or flake materials.

To overcome this disadvantage, it is known to charge the press with only the friction layer powder and to cold press the intermediate-layer powder with elevated pressing forces onto the braking plate. The braking plate with the intermediate layer pressed thereon can then be placed on the mold and the main pressing process undertaken in the manner described.

This approach, however, is not applicable to all materials. For example, the intermediate layer may not be retained on the braking plate. Even when the intermediate layer may be retained on the braking plate it is possible that the pressing operation will not effect a satisfactory bond to the intermediate layer because the density of the layer on the backing plate may be too high.

With such materials, the press mold must first be charged with the friction layer powder and this layer must be leveled in the mold. Then the intermediate-layer powder must be filled into the press and leveled. Only then can the backing plate be applied and the press process begun. All of these manipulations, of course, are time consuming so that the utilization of the press is not optimum.

There are hot presses which have been provided with a plurality of press molds. In these presses a number of friction linings or members can be pressed simultaneously. However, individual control of the pressing force is not possible and this can be a major drawback. These hot presses are usually charged with cold prepressed blanks or preforms to reduce the time required for charging the press. In practice, this process has not found application in the production of asbestos-free linings which are the main friction products currently produced because the preform generally is not found to be sufficiently stable. As a consequence, the problems which arise are similar to those which have been described where the intermediate layer cannot be cold pressed to the backing plate.

The powders which may be used have widely divergent properties and require different compaction ratios. The term "compression ratio" is here used to refer to the ratio between the volume of the finish-pressed lining or member to the volume of the powder constituting same prior to compression. The materials most widely used require compaction or compression ratios of up to 1:10.

For such materials, when the press mold is to be charged directly with the friction and/or intermediate-layer powders, the press mold height must be very high to accommodate this compression ratio. When the press is charged with a cold prepressed blank or preform, however, the height of the press mold naturally can be substantially smaller since it need only accommodate the compression ratio actually preformed by the press. Since the height of the press mold contributes materially to the fabrication cost of the friction member, on the one hand because of the capital cost of the mold and on the other hand because of the compression stroke and press-cycle time required, it is advantageous to minimize the height of the press mold. In addition, with a shorter press mold, energy cost can be reduced since the press mold is generally heated over its entire height.

Cold-prepressed preforms, however, cannot always be used.

OBJECTS OF THE INVENTION

It is the principal object of the present invention to provide an improved method of charging a press for the purposes described which may be used for all kinds of friction and intermediate-layer powders and materials, which permits press charging in a short period of time and allows a press to be used which has a comparatively small height.

Another object of the invention is to provide a method of making friction members with an improved charging of the press so that friction members of higher quality can be produced than has as heretofore been the case.

It is also an object of the invention to provide an improved press charging method which can be utilized for all kinds of press installations, including turntable installations.

SUMMARY OF THE INVENTION

These objects and others which will become apparent hereinafter are attained, in accordance with the present invention, in a method of charging a press for making a friction member, a friction lining, wherein the press comprises a lining mold and a press ram adapted to extend into the lining mold from below to compress a body of material contained therein in the formation of the friction member, the method comprising the steps of:

(a) filling a friction powder into an intermediate mold and precompressing the friction powder in the intermediate mold, the intermediate mold having an internal contour conforming to that of the friction lining;

(b) thereafter filling an intermediate-layer powder into the intermediate mold upon the precompressed friction powder, thereby forming a body of material in the intermediate mold;

(c) raising the press ram in the lining mold and placing the intermediate mold on the lining mold in registry with the internal contour thereof whereby the body of material is supported on the press ram;

(d) lowering the press ram and simultaneously pressing downwardly on the body of material from above with an ejection ram synchronously with the lowering of the press ram to transfer the entire body of material into the lining mold between the rams; and (e) withdrawing the ejection ram from the intermediate mold and removing the intermediate mold from the lining mold to permit pressing of the member from the body of material.

The method also can be considered a method of making a friction member.

A method of making a friction member having a support, and a friction lining on the support in a press which comprises a lining mold and a press ram adapted to extend into the lining mold from below to compress a body of material contained therein in the formation of the friction member, can comprise the steps of:

(a) filling a friction powder into an intermediate mold and precompressing the friction powder in the intermediate mold, the intermediate mold having an internal contour conforming to that of the friction lining;

(b) thereafter filling an intermediate-layer powder into the intermediate mold upon the precompressed friction powder, thereby forming the body of material in the intermediate mold;

(c) raising the press ram in the lining mold and placing the intermediate mold on the lining mold in registry with the internal contour thereof whereby the body of material is supported on the press ram;

(d) lowering the press ram and simultaneously pressing downwardly on the body of material from above with an ejection ram synchronously with the lowering of the press ram to transfer the entire the body of material into the lining mold between the rams;

(e) withdrawing the ejection ram from the intermediate mold and removing the intermediate mold from the lining mold to permit pressing of the member from the body of material;

(f) positioning a counterpressure plate against an upper surface of the lining mold and juxtaposing with an upper surface of the body of material, the support so that the support lies between the counterpressure plate and the body of material;

(g) bracing the counterpressure plate from above with a counterpressure piston; and (h) advancing the press ram upwardly to compress the body of material while applying heat to the body of material to form the lining and bond the lining to the support by an intermediate layer.

The friction layer powder, in accordance with the present invention, is not, therefore, directly charged into the press mold, but rather into the intermediate mold. The intermediate mold is uniformly filled and the powder therein is compressed. For example, with a friction layer having a compression ratio of 1:10 at a pressing force of 2000N, the precompression in the intermediate mold can be to ⅓ of its original volume so that within the press a compression ratio of only about 1:3 is required.

The precompression in the intermediate mold in accordance with the invention can utilize a lesser force than is required for the above-mentioned cold compression. This is possible because it is not necessary to create by this precompression a stable preform capable of being self-supporting when it is placed in the press.

Since the friction material is held in an intermediate mold it can be transported to the press in the intermediate mold and held in the press in the intermediate mold until it is transformed to the press mold.

While the ram of the press is in its upper position, i.e. the press mold is completely filled with the ram, the intermediate mold can be set upon the main mold so that the normal contours of the two molds are flush with one another. The ejection ram is then pressed against the powder in the intermediate mold and the ejection ram and main ram are lowered synchronously.

This lowering movement of the main ram and the ejection ram is halted as soon as all of the powder in the intermediate mold has been transferred to the main mold. The powder can be transferred to the main mold in a clean, rapid and effective manner without disruption because of the synchronous lowering movement, thereby ensuring that the main mold can be uniformly filled.

With the method of the invention the thickness of the precompact in the intermediate mold can be selected at will. For each type of friction powder it is possible to select the most effective compromise since the greater the degree of precompaction, the lower can be the height of the main mold and the cost of the press and its operation. On the other hand, the effectiveness of the bonding of the individual layers together and to the backing plate can be considered with respect to the selection of the precompact thickness.

It has been found to be advantageous to provide the intermediate mold with a closable bottom, to fill the intermediate mold with the friction powder after the bottom has been closed and to open the bottom after the intermediate mold has been placed on the main mold.

There are lining material which may not even be stable in an intermediate mold after precompaction and thus cannot be transported reliably in an intermediate mold without a bottom. For such materials the closable bottom provides an effective solution.

When a friction lining, especially a brake lining, with an intermediate layer is to be fabricated, in accordance with the invention, after compaction of the friction layer powder in the intermediate mold the intermediate-layer powder can be uniformly filled into the latter and if desired precompacted again therein. In this manner the press can be charged with both the friction layer and the intermediate-layer powder in a single charging step and a constant thickness of the intermediate layer is ensured.

According to another feature of the invention, the intermediate mold is formed of two super posed parts with the identical normal contour, whose total height for receiving the powder is sufficient to accommodate all of the powder prior to the precompaction, the lower part being of a height sufficient only to receive the precompacted friction and intermediate-layer powders.

After the precompaction, therefore, the upper part of the intermediate mold is removed and only the lower part transported to the press.

This means that in the press only sufficient room need be made above the main mold to accommodate the lower part of the intermediate mold and the additional space required by the upper part of the intermediate mold need not be supplied. This reduces significantly the stroke of the counterpressure piston and/or the thickness of the counterpressure plate which is used to brace the molded parts against the press force.

A press which can be used in conjunction with the charging method and which can be employed for carrying out the method of making the friction members of the invention comprises a press cylinder with a press ram actuated by a press piston, a press mold in which the friction material is finally compacted and a counterpressure plate which can be swung out of position above the press mold or into position thereabove. A counterpressure cylinder with a counterpressure piston can be provided to brace the counterpressure plate against the force generated by the press piston.

According to the invention, the counterpressure cylinder lies above the press mold in the frame of the press and above the counterpressure cylinder an actuating device, for example, a pneumatic cylinder is provided for the ejection ram which can have its rod extending through the counterpressure piston and can be received in a recess at the lower end thereof.

More specifically, the press apparatus can comprise:
a press frame;
a press cylinder mounted on the frame and provided with a fluid-displaceable press ram;
a main mold adapted to receive a body of material compressible to form a lining for the friction member and to be surmounted by a removable intermediate mold containing the body of material in an at least partially precompressed state;
a counterpressure cylinder on the frame having a counterpressure piston adapted to brace a counterpressure plate against the main mold;
an ejection ram carried by the counterpressure piston and adapted to engage the body of material in the intermediate mold with the press ram for transfer of the body of material to the main mold, the counterpressure piston having a recess opening toward the main mold and receiving the ejection ram; and
an actuator operatively coupled to the ejection ram through the counterpressure piston for displacement of the ejection ram for the transfer of the body of material to the main mold.

In this press, therefore, a hydraulically or pneumato-hydraulically actuated press ram can be raised in the press mold. To prevent the material in the mold from being pressed out of it by the press ram, the counterpressure plate is required and must be held upon the press mold with a force which is greater than the force which can be generated by the press ram.

In addition to these known elements, the ejection ram is provided and serves to press the friction powder from the intermediate mold when the latter is mounted on top of the press mold. The ejection ram can be recessed in the underside of the counterpressure piston so that, during the pressing operation, it will not interfere with the retention of the counterpressure plate against the mold by the counterpressure piston.

The actuator for the ejection ram, for example, a pneumatic cylinder, lies above the counterpressure cylinder.

For charging of the press, the counterpressure plate is shifted out of the latter to provide a place for the intermediate mold. Simultaneously this permits the ejection ram to move from its recessed position to apply pressure to the friction powder or the intermediate-layer powder in the intermediate mold.

A simple connection between the ejection ram and its actuator can be realized by providing the counterpressure piston with a bore through which a connecting rod between the ejection ram and its actuator is guided. A spring can be disposed in this bore and can be prestressed to bias the rod in one direction.

In this case, the actuator need apply force only in one direction to the rod while the force stored by the spring can return the rod in the opposite direction. When a turntable is used, each press can have its own connecting rod but for the entire set of presses of the turntable only a single fixedly located actuator need be provided which can be double acting, i.e. displaceable in both directions.

The ejection ram indeed need only be operated during charging, i.e. at the manipulation station. During the press process, wherein the presses of the turntable are displaced away from and only later returned to the manipulation station, the springs can hold the ejection rams in their upper positions.

In accordance with a further feature of the invention, the counterpressure plate is swingable on an upright or post of the frame to provide the free space in which the intermediate mold can be received.

In this case it is advantageous to provide the counterpressure plate as an electromagnet adapted to pickup a backing plate.

The counterpressure plate can thus have an additional function, apart from biasing the friction member against the upward force of the press ram, namely, that of charging the press with the backing plate when the counterpressure plate is swung away to allow the press to accommodate the intermediate mold.

In the outwardly swung position, a backing plate can be disposed beneath the counterpressure plate and the electromagnet energized so that the backing plate will be magnetically picked up by the counterpressure plate.

Upon swinging of the counterpressure plate back into the press and application by the counterpressure piston of the counterpressure plate against the press mold, the backing plate is automatically positioned to have the friction and intermediate layers bonded thereto.

At the conclusion of the press process, the completed friction member can be magnetically removed from the press by the counterpressure plate.

Since the counterpressure plate usually is heated, the backing plate can be preheated before it is involved in the pressing operation. This improves the quality of the finished product or reduces the hardening time.

Alternatively, other grippers, for example, a vacuum or suction gripper can be used. Electromagnets, however, appear to be the most practical for the ferromagnetic backing plates most commonly used for brakeshoes.

It has been found to be advantageous to provide beneath the counterpressure plate in its outwardly swung position a magazine supplying the backing plates directly to the counterpressure plate so that the counterpressure plate can pick up the backing plates in succession from the magazine and carry the backing plate to the press mold.

Advantageously the magazine can have a plurality of stacks of different backing plates. With this type of magazine, utilizing a turntable machine, I can produce a variety of different brakeshoes. The magazine for the backing plates is fixed with respect to the turntable and the presses of the turntable are stepped past the magazine to come into proximity thereto in succession to receive the backing plate. An appropriate backing plate can then be supplied for each press.

BRIEF DESCRIPTION OF THE DRAWING

The above and other objects, features and advantages of the present invention will become more readily apparent from the following description, reference being made to the accompanying diagrammatic drawing in which.

SPECIFIC DESCRIPTION

Figures 1, 4:
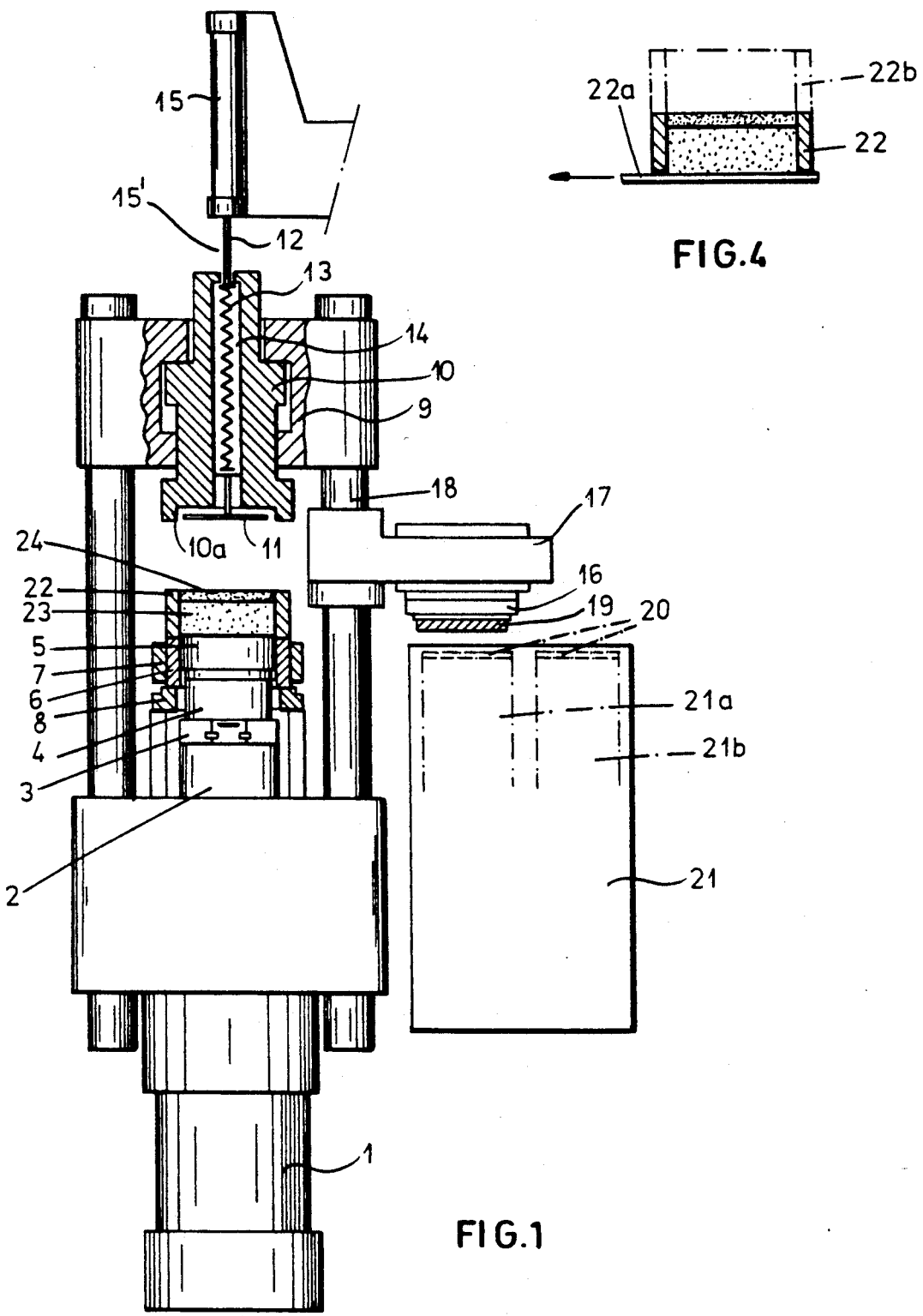
FIG. 1 is a fragmentary vertical section of a press shown highly diagrammatically, charged with the intermediate mold and the powders for the friction and intermediate layers, and with the counterpressure plate swung away.
FIG. 4 is a schematic view of the intermediate mold according to another embodiment of the present invention.

In the drawing, I have shown a press having a conventional hydraulic press cylinder 1, which can apply a maximum pressing force, depending upon the friction member to be produced, of 300, 650, or 1000 kN. When the force is not required to be too high, in place of the hydraulic cylinder I may use a pneumatic cylinder with a pneumohydraulic force stroke.

Within this press cylinder 1, there is provided a press piston (not shown) which has an intermediate or connecting member 2 supporting a coupling plate 3 and an intermediate ram part 4 with thermal insulation adjacent the heated press ram 5. The press ram 5 is shown to be received in the press mold 6 which is surrounded by a heater having the configuration of the press mold 6.

The press mold 6 is mounted on a flange 8 with thermal insulation.

Above the press mold 6 on the press frame, there is provided a counterpressure cylinder 9 with a counterpressure piston 10.

On the underside of the counterpressure piston 10 a recess 10a is formed to accommodate the ejection ram 11.

A connecting rod 12 extends through a central bore 14 of the counterpressure piston 10 and is biased upwardly by a spring 13 in the counterpressure piston.

The connecting rod 12 is connected at its bottom end with the ejection ram 11 and is engageable at its top by the actuating device 15.

The connection between the actuating device 15 and this rod 12 is not fixed as can be seen from the gap 15' but rather is an abutting connection between two vertically aligned rods.

Attractive force to lift the ejection ram is not necessary because the spring 13 biases the ram upwardly. As a consequence, the press can be separate from the actuating device as is important for turntable press arrangements.

Between the press mold 6 and the ejection ram 11, I provide a heated counterpressure plate 16 which is formed as an electromagnet. The counterpressure plate 16 is vertically shiftable in a carrier 17 and is biased by springs (not shown) upwardly. The carrier 17 is swingable on the upright or post 18 of the frame.

The ejection ram 11 should not be permitted to become too hot since there is a danger that powder can adhere to it. To hold its thermal conductivity as low as possible, the heated counterpressure plate 16 is mounted on the carrier 17 only at three points. The counterpressure piston 10 bears only at four points on the counterpressure plate 16. Between these four points air-flow slits are provided and therefore cooling air flows through these slits and through the bore 14 in the counterpressure piston 10.

Directly below the counterpressure plate in its outwardly swung position, there is provided a magazine 21 which can have two or more stacks 21a, 21b of different backing plates selectively engageable by the electromagnetic counterpressure plate 16.

The press is operated in the following manner:

The counterpressure plate 16 is swung outwardly (FIG. 1). At this instant there is located below the underside of the electromagnetic counterpressure plate 16 a finished brakeshoe 19 from the prior press process.

The electromagnet is then de-energized so that the brakeshoe can drop off from the counterpressure plate. Thereupon the electromagnet is re-energized to pickup a backing plate from magazine 21. The backing plate thus magnetically adheres to the counterpressure plate and is preheated thereby.

Simultaneously, the press mold 6 and ram 5 are cleaned and sprayed with an adhesion-preventing agent, the purpose of which is to prevent the friction powder or intermediate-layer powder from adhering to the press mold 6 or the ram 5.

The pressing ram 5 is raised to its upper position and an intermediate mold 22 containing the precompacted friction layer powder 23 and an intermediate-layer powder 24 is placed upon this press mold.

When the intermediate mold 22 has a closeable bottom, this bottom is opened.

The actuating device 15 is then activated and by downward pressure on the rod 12, presses the ejection ram 11 onto the friction layer powder 23 and the intermediate-layer powder 24 in the intermediate mold.

The press ram 5 and the ejection ram 11 are lowered synchronously with the powder layers 23 and 24 trapped between them to carry the powder layers without disruption into the press mold 6.

The lowering action is interrupted as soon as all of this material has passed out of the intermediate mold 22 and into the press mold 6. Further lowering is disadvantageous because the material must then be lifted again during the press stroke, thereby allowing powder to penetrate between the ram 5 and the press mold 6 and also disrupting the uniform thickness of the intermediate-powder layer 24.

When the upper surface of the intermediate layer thus is flush with the upper surface of the press mold 6, the actuator 15 is cut-off and the spring 13 lifts the ejection ram 11 into its upper position in which the ejection ram is recessed in the counterpressure piston 10.

Figure 2:
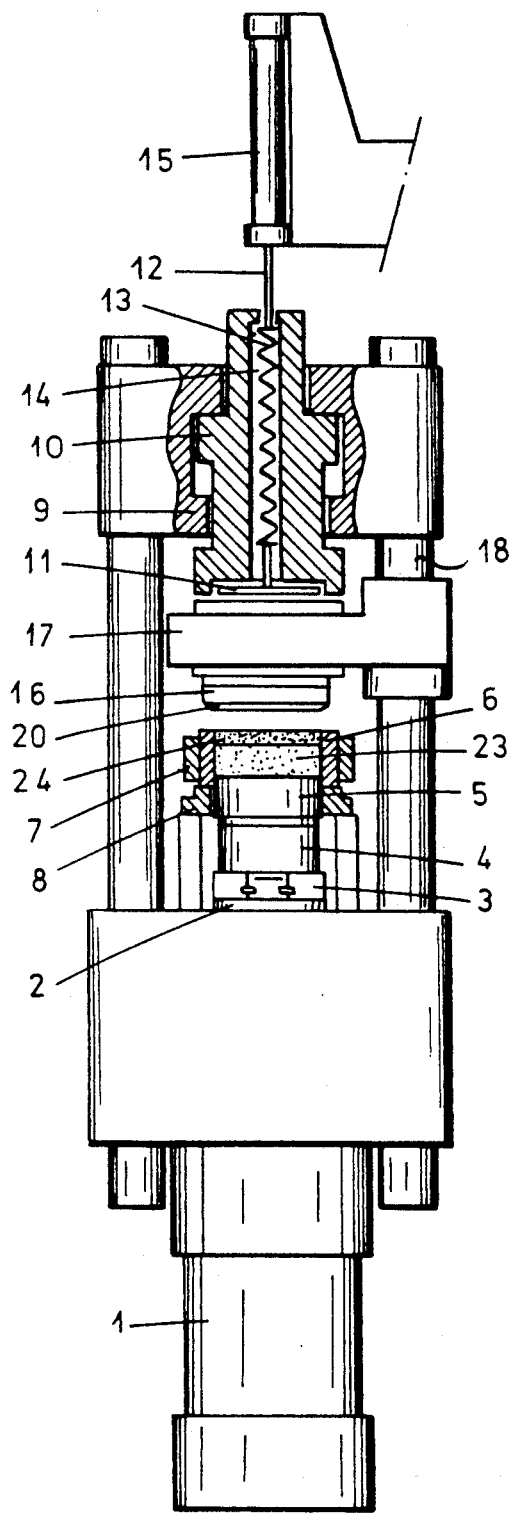
FIG. 2 is a similar view of the press with the counterpressure plate swung into the path of the counterpressure piston.

The intermediate mold 22 is then removed and the carrier 17 is swung into the press (FIG. 2).

The counterpressure plate 16 has the preheated backing plate adhered electromagnetically to its underside and is forced against the press mold by the downward stroke of the counterpressure piston until the backing plate 20 lies upon the press mold.

In this position, the counterpressure piston develops a force which is higher than the pressing force to be applied by the ram 5 to reliably prevent lifting of the backing plate 20 from the press mold. At this point in time, of course, the press mold is filled with the precompacted friction layer powder and preferably also the precompacted intermediate-layer powder.

Figure 3:
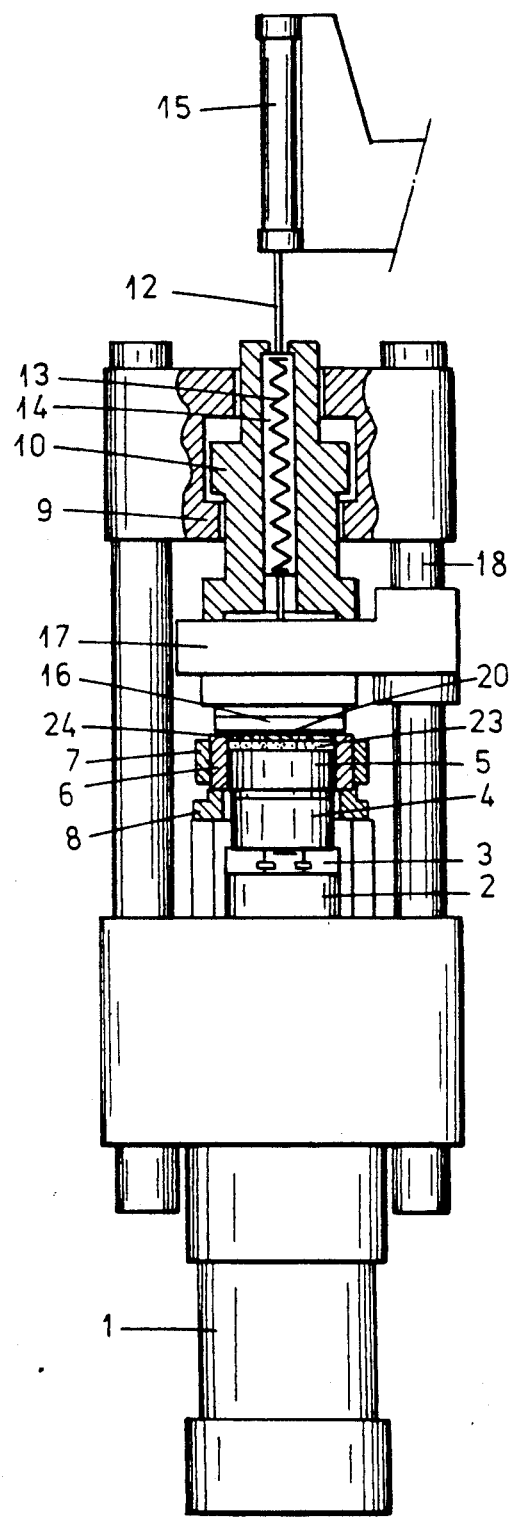
FIG. 3 is a similar illustration of the press during the main pressing operation.

The main press stroke is then applied by the ram 5 upwardly with pressurization of press cylinder 1 (FIG. 3) during the pressing operation, the ram 5 may be lowered from time to time to vent gases generated during pressing.

The pressing can be effected to a constant pressing force or to a constant pressing volume. The latter is necessary for many friction members requiring a long hardening time because with such materials the application of a constant pressure will result in excessive compaction. The press ram thus must be preprogrammed as to its position for filling, venting, and constant volume pressing.

At the end of the pressing process, the counterpressure piston 10 is raised to its upper position and the counterpressure plate 16 is shifted by its springs into its upper position in the carrier 17. The press ram 5 is then raised to its upper position flush with the upper surface of the press mold. This lifts the finished brakeshoe from the press mold. The counterpressure piston 10 then lowers the counterpressure plate 16 onto the finished brakeshoe and its electromagnet is re-energized so that the counterpressure plate picks up the finished brakeshoe.

The counterpressure piston 10 is again raised to its upper position and the carrier 17 swung outwardly to return to the starting position of FIG. 1 and a new cycle. The press of the invention and the charging method can be used for individual presses or for turntable or like multi-press installations.

In FIG. 4 I have shown a two part intermediate mold in which the part 22 is surmounted by a part 22b adapted to receive the full volume of the powder prior to the precompaction. After precompaction the intermediate mold part 22b is removed so that only the part 22 with its removable bottom plate 22a need be inserted in the press. The bottom plate can be simply pulled out to open the bottom plate of the mold.

I claim:

1. A press for making a friction member, comprising:
   a press frame;
   a press cylinder mounted on said frame and provided with a fluid-displaceable press ram;
   a main mold adapted to receive a body of material compressible to form a lining for said friction member and to be surmounted by a removable intermediate mold containing said body of material in an at least partially precompressed state;
   a counterpressure cylinder on said frame having a counterpressure piston adapted to brace a counterpressure plate against said main mold, said frame including a post and means for swingably mounting said counterpressure plate on said post for displacement into and out of registry with said main mold;
   an ejection ram carried by said counterpressure piston and adapted to engage the body of material in said intermediate mold with said press ram for transfer of said body of material to said main mold, said counterpressure piston having a recess opening toward said main mold and receiving said ejection ram; and
   an actuator operatively connected with said ejection ram through said counterpressure piston for displacement of said ejection ram for said transfer of said body of material to said main mold.

2. The press defined in claim 1 wherein said actuator includes a pneumatic cylinder.

3. The press defined in claim 1 wherein said counterpressure piston is formed with an axial bore traversed by a connecting rod engageable by said actuator and coupled to said ejection ram, a spring received in said axial bore resiliently biasing said ejection ram in one axial direction.

4. The press defined in claim 1 wherein said counterpressure plate is provided with electromagnet means enabling said counterpressure plate to pick up and position a support plate adapted to bond to said lining.

5. The press defined in claim 4, further comprising a magazine cooperating with said counterpressure plate in a position in which said counterpressure plate is swung out of registry with said main mold for supplying said support plates to said counterpressure plate.

6. The press defined in claim 5 wherein said magazine is provided with a plurality of stacks of different support plates.

7. The press defined in claim 6 wherein said actuator includes a pneumatic cylinder.

8. The press defined in claim 7 wherein said counterpressure piston is formed with an axial bore traversed by a connecting rod engageable by said actuator and coupled to said ejection ram, a spring received in said axial bore resiliently biasing said ejection ram in one axial direction.

* * * * *